United States Patent [19]

Chapin

[11] 4,135,419
[45] Jan. 23, 1979

[54] RIP-CROSS CUT GUIDE FOR CIRCULAR SAW

[75] Inventor: Everett E. Chapin, Latrobe, Calif.

[73] Assignee: Vivian G. Chapin, Shingle Springs, Calif. ; a part interest

[21] Appl. No.: 836,617

[22] Filed: Sep. 26, 1977

[51] Int. Cl.² .............................................. B27B 5/20
[52] U.S. Cl. ................................. 83/471.3; 83/486.1; 83/745
[58] Field of Search .................... 83/745, 486.1, 471.2, 83/471.3, 477.1, 477.2

[56] References Cited

U.S. PATENT DOCUMENTS

| 3,151,642 | 10/1964 | Olson | 83/486.1 |
| 3,389,724 | 6/1968 | Paul | 83/745 X |
| 4,007,657 | 2/1977 | Burch | 83/477.1 X |

*Primary Examiner*—Willie G. Abercrombie
*Attorney, Agent, or Firm*—Clarence A. O'Brien; Harvey B. Jacobson

[57] ABSTRACT

An elongated horizontal support member is provided including upper and lower marginal edges. One pair of ends of a pair of parallel horizontal arms overlie and are secured to the upper marginal edge of the support member with the other free ends of the arms projecting outwardly of one side of the support member. The arms define opposing channels and a square panel is provided and includes pairs of opposite side edges selectively guidingly receivable within the channels. One marginal edge of the panel has a closed-ended vertical slot formed therein extending therealong and the panel includes structure for clamping the base plate of a circular saw thereon with the lower marginal edge of the saw blade projecting downwardly through the slot. The upper marginal edge of the support member has an upwardly opening notch formed therein inwardly of and closely adjacent a first of the arms and when the one edge of the panel is slidingly received within the first arm channel the slot is aligned with the notch and the latter may receive the lower marginal edge of the blade therethrough. In addition, the baseboard extends along the side of the support member from which the arms project and is spaced below and parallels the plane in which the arms are disposed and the upper surface of the board may have a workpiece to be cut placed thereon. The panel may be alternately positioned with the slot disposed transverse to the support member for cross cutting or with the slot paralleling the support member for rip cutting.

11 Claims, 4 Drawing Figures

RIP-CROSS CUT GUIDE FOR CIRCULAR SAW

BACKGROUND OF THE INVENTION

Various forms of jigs for use in conjunction with circular saws have been heretofore provided. However, these jigs have not been readily adaptable for use in conjunction with various forms of circular saws and have been, for the most part, complex in nature and not well adapted to perform both a cross cutting operations and a rip cutting operations.

Accordingly, a need exists for an improved jig to be utilized in conjunction with a circular saw and which will be of relatively simple construction and operable to support the associated circular saw during both rip and cross cut sawing operations.

Examples of various forms of previously known circular saw jigs and other sawing machines including some of the general structural and operational features of the instant invention are disclosed in U.S. Pat. Nos. 861,890, 1,457,492, 2,903,026, 3,331,406, 3,384,135 and 4,007,657.

BRIEF DESCRIPTION OF THE INVENTION

The jig of the instant invention may be utilized in conjunction with circular saws for performing both rip and cross cut sawing operations. In addition, the jig is of relatively simple construction and may be utilized in conjunction with any suitable form of baseboard such as a 2 × 12.

The main object of this invention is to provide a jig for use in conjunction with conventional circular saws and which may be utilized to perform both cross cut and rip sawing operations.

Another object of this invention is to provide a saw jig in accordance with the preceding objects and which may be quickly transformed from a form thereof adapted for cross cutting operations to a form thereof adapted for rip cutting operations.

Yet another object of this invention is to provide a jig which may be utilized in conjunction with various forms of circular saws.

Another very important object of this invention is provide a jig which may utilize a conventional 2 × 12 for a baseboard.

A final object of this invention to be specifically enumerated herein is to provide a circular saw jig in accordance with the preceding objects and which will conform to conventional forms of manufacture, be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
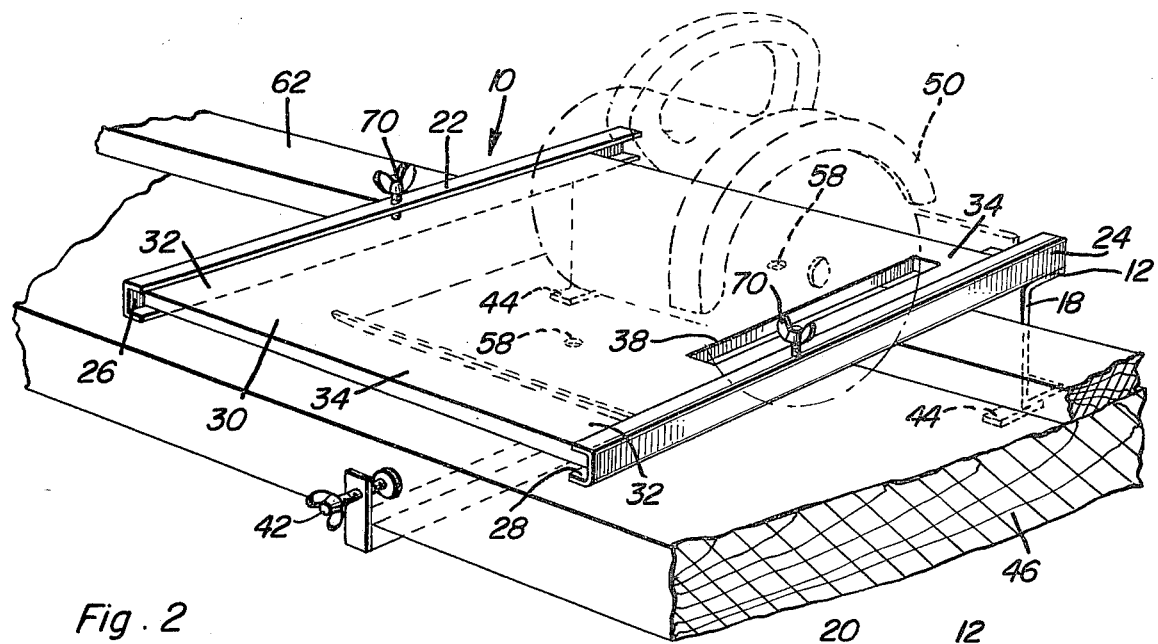
FIG. 1 is a perspective view of the saw jig of the instant invention with the various components thereof in relative positions to perform a cross-cut sawing operation.
Figure 2:
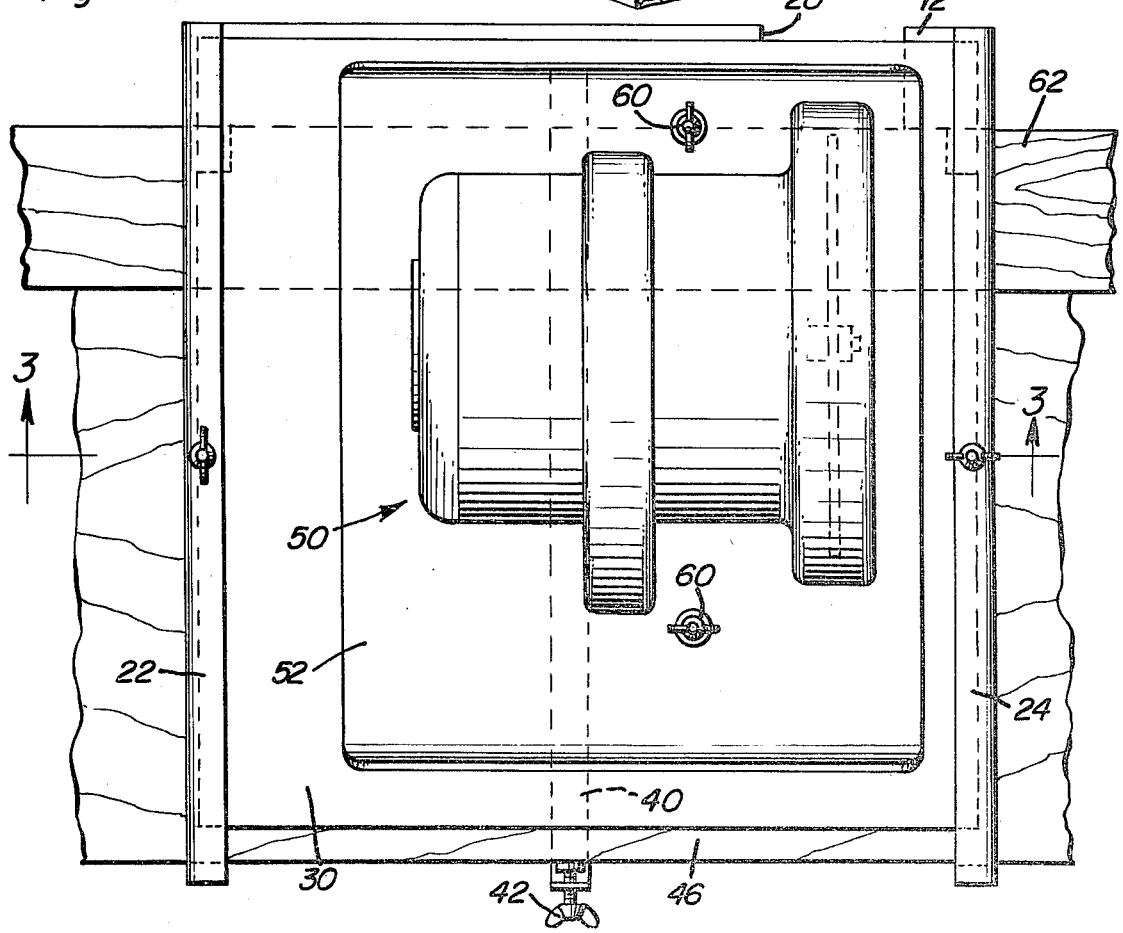
FIG. 2 is an enlarged top plan view of the assemblage illustrated in FIG. 1.

Referring now more specifically to the drawings the numeral 10 generally designates the jig of the instant invention. The jig 10 includes an elongated horizontal channel member 12 including upper and lower flanges 14 and 16 interconnected by means of an upstanding web 18 extending therebetween. The support member 12 includes an upwardly opening notch 20 formed in one end portion thereof and which extends downwardly to the vertical midportion of the web 18 and opens upwardly through the flange 14.

Figure 3:
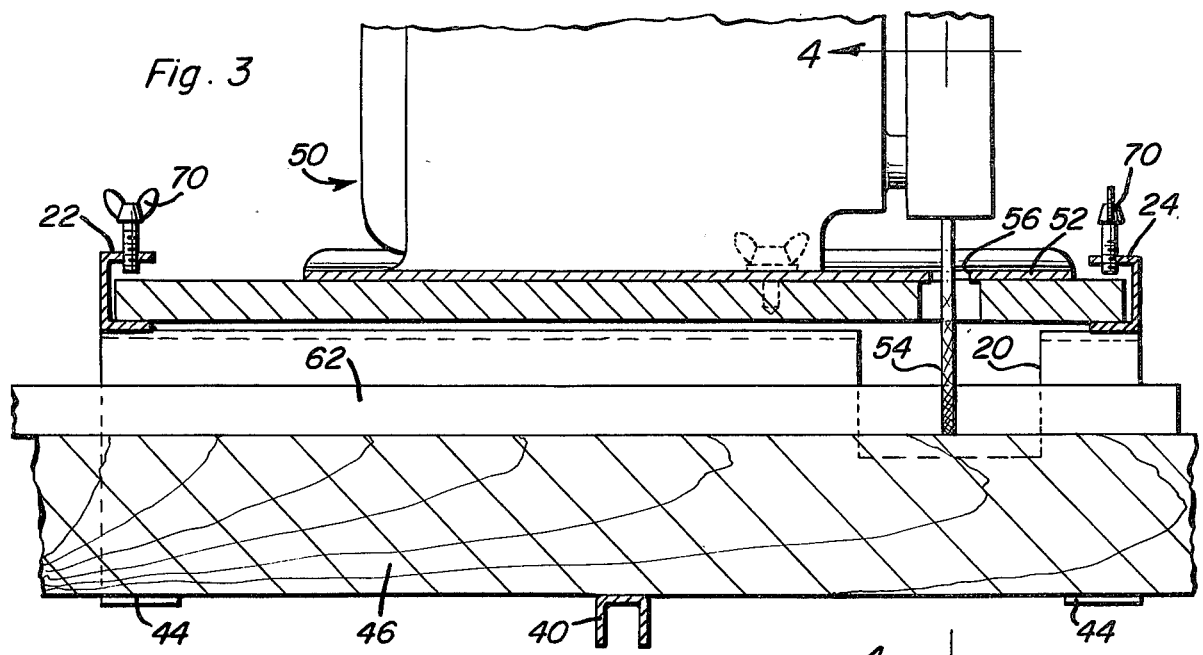
FIG. 3 is an enlarged fragmentary vertical sectional view taken substantially upon the plane indicated by the section line 3—3 of FIG. 2.
Figure 4:
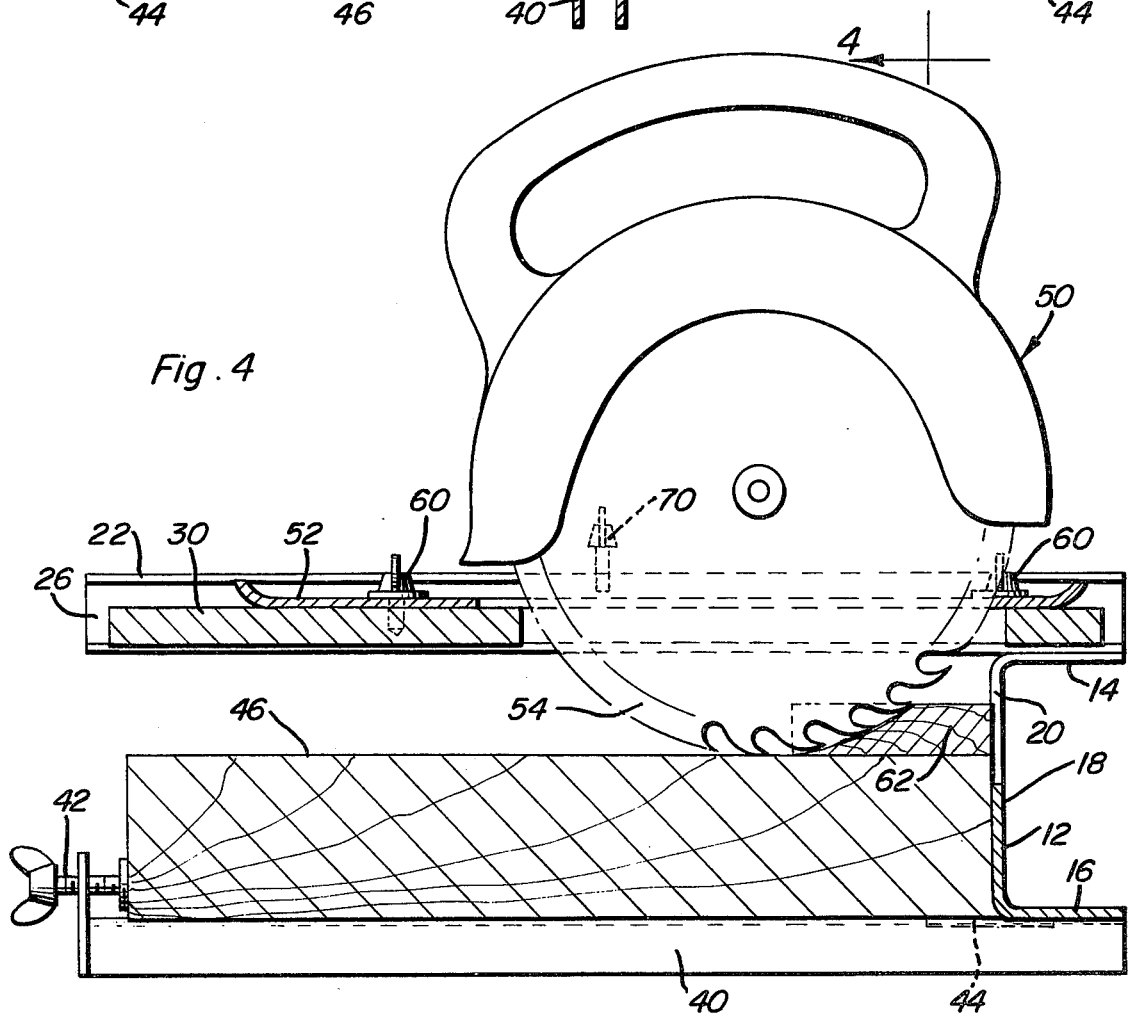
FIG. 4 is a vertical sectional view taken substantially upon the plane indicated by the section line 4—4 of FIG. 3.

A pair of parallel horizontal arms 22 and 24 include one pair of corresponding end portions which overlie and are secured to the upper surface portions of the opposite ends of the upper flange 14 with the other pair of ends of the arms 22 and 24 projecting outwardly of the side of the channel member 12 opposite to which the flanges 14 and 16 project. The arms 22 and 24 define opposing channels 26 and 28 extending longitudinally therealong and a square support panel 30 is provided including first and second pairs of remote marginal edge portions 32 and 34. The panel 30 may be disposed as illustrated in FIG. 1 of the drawings with the marginal edge portions 32 slidably received within the channels 26 and 28, or the panel 30 may be disposed with the marginal edge portions 34 thereof slidably received in the channels 26 and 28. Further, it may be seen from FIG. 1 that the panel 30 includes an elongated vertically extending and closed-ended slot 38 formed therein closely adjacent and paralleling the side marginal edge 32 of the panel 12 slidingly received within the channel 28. Further, it may be seen from FIG. 3 of the drawings that when the marginal edge 32 is slidably received within the channel 28 the slot 38 is registered with the notch 20.

An elongated horizontal brace 40 comprising a downwardly opening channel member has one end thereof secured to the under surface of the flange 16 in any convenient manner with the other end of the brace 40 projecting outwardly from the same side of the channel or support member 12 from which the arms 22 and 24 project. The brace 40 parallels and is spaced below the plane in which the under surface portions of the arms 22 and 24 are disposed and the outer end of the brace 40 includes an upwardly offset threadedly manage clamp 42 which may be threadedly adjusted toward and away from the web 18.

The opposite end portions of the support or channel member 12 include horizontally abutment flanges 44 underlying and secured to the under surface of the flange 16 with the flanges 44 projecting outwardly of the same side of the support or channel member 12 from which the arms 22 and 24 as well as the brace 40 projects. The upper surfaces of the abutment flanges 44 and co-planar with the upper surface of the brace 40 and baseboard 46 comprising a 2 × 12 rests upon the upper surface of the brace 40 and the upper surfaces of the abutment flanges 44 with the board 46 extending along and abutted against the web 18. Of course, the clamp 42 engages the side of the board 46 remote from the web 18 and clamps the board 46 against the web 18.

A conventional form of circular saw is referred to in general by the reference numeral 50 and includes a slotted-base plate 52 downwardly through which the circular blade 54 of the saw 50 projects, the plate 52 having a slot 56 therein to receive the blade 54 therethrough. In addition, the base plate 52 has a pair of openings 58 formed therethrough by which the base plate 52 may be secured in position on the upper surface of the panel 40 through the utilization of thumb screws 60.

When either pair of opposite side marginal edge portions of the panel 30 are engaged in the channels 26 and 28 the lower periphery of the saw blade 54 lightly contacts the upper surface of the board 46 and a workpiece 62 to be cross cut may be placed on top of the board 46 and against the web 18. Thereafter, the panel 30 may be moved from the free end portions of the channels 26 and 28 defined by the arms 22 and 24 toward the support member or channel member 12 in order that the blade 54 may form a cross cut in the workpiece 62. On the other hand, if a second workpiece (not shown) is to be rip cut, it may be placed upon the board 46 with one longitudinal edge portion thereof abutted against the web 18. Then, the panel 30 is disengaged from the arms 22 and re-engaged therewith the marginal edge portions 34 thereof slidably received within the channels 26 and 28. In this position, the saw blade 54 will be disposed parallel to the web 18 and the workpiece to be rip cut may be longitudinally shifted along the board 46 while in longitudinal edge abutting relationship with the web 18.

When the rip cutting operation is being performed, the clamp screws 70 threadedly engaged with the arms 22 and 24 are threaded downwardly into clamped engagement with the corresponding edge portions of the panel 30 in order that the latter may be maintained in predetermined positions within the channels 26 and 28. Thus, the width of the rip cut to be made may be measured between the opposing sides of the circular saw blade 54 and the web 18.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A jig for supporting a circular saw and a workpiece for cross cutting rip cutting the workpiece, said jig including a main horizontal elongated support member having opposite end portions, a pair of parallel horizontal arms secured at one pair of corresponding ends to the opposite end portions of the upper marginal edge portion of said support member with the other pair of ends of said arms projecting outwardly from one side of said support member, one end portion of said support member having an upwardly opening notch formed in the upper marginal edge portion thereof inwardly of the corresponding arm, an elongated horizontal brace secured at one end to the lower marginal portion of said elongated support member intermediate its opposite ends and with the other end of said brace projecting outwardly from said one side of said support member with said arms disposed in a horizontal plane spaced above said brace, the opposite ends of said elongated support member including a pair of abutments projecting outwardly of said one side of said support member generally co-planar with the upper surface of said brace, said arms defining opposing guides, a horizontal square panel having pairs of opposite side edge portions guidingly receivable in said guides for guided movement therealong, an elongated closed-ended slot formed therein adjacent and paralleling one edge portion of one of said pairs of edge portions and means for clamping the base plate of a circular saw on the upper surface thereof with the circular blade of said saw received downwardly through said slot, said slot being aligned with said notch when said one edge portion is guidingly engaged in the guide adjacent said notch, the outer end of said brace including upwardly offset clamp means opposing and adjustably movable toward said one side of said support member.

2. The combination of claim 1 wherein said arms define opposing channels defining said guides.

3. The combination of claim 1 wherein said support member comprises a channel member opening outwardly of the other side thereof and including upper and lower flange portions, said one pair of ends of said arms overlying and being secured to the upper surface of said upper flange portion and said one end of said brace underlying and being secured to the under surface of said lower flange portion.

4. The combination of claim 3 wherein said abutments also underlie and are secured to the under surface of said lower flange portion.

5. The combination of claim 1 wherein said slot parallels said support member when the other pair of edge portions are guidingly received in said guides, said arms including clamp means operative to releasably clamp said other pair of edge portions of said panel in adjusted positions within said guides.

6. The combination of claim 5 wherein said arms define opposing channels defining said guides.

7. The combination of claim 6 wherein said support member comprises a channel member opening outwardly of the other side thereof and including upper and lower flange portions, said one pair of ends of said arms overlying and being secured to the upper surface of said upper flange portion and said one end of said brace underlying and being secured to the under surface of said lower flange portion.

8. The combination of claim 1 including an elongated workpiece supporting board extending along said one side of said support member and resting upon the upper surfaces of said brace and abutments, said clamp means being activated to clamp said board against said one side of said elongated member.

9. The combination of claim 8 wherein said support member comprises a channel member opening outwardly of the other side thereof and including upper and lower flange portions, said one pair of ends of said arms overlying and being secured to the upper surface of said upper flange portion and said one end of said brace underlying and being secured to the under surface of said lower flange portion.

10. The combination of claim 9 wherein said abutments also underlie and are secured to the under surface of said lower flange portion.

11. A jig for supporting a circular saw and a workpiece for cross cutting and rip cutting the workpiece, said jig including a main horizontal elongated support member having opposite end portions, a workpiece supporting board, support means supporting said board from said support member with said board extending along one side of said support member and projecting outwardly therefrom, a pair of parallel horizontal support arm including one pair of corresponding ends supported from opposite end portions of said support member with the other pair of corresponding ends of said arms projecting outwardly of said one side of said support member, disposed in a plane paralleling and spaced above said board, and being free of connections with said board and support means, whereby an outwardly opening elongated workpiece receiving recess extending along said one side of said support member is defined opening laterally outwardly between said board and the other pair of corresponding ends of said arms and in which to laterally receive an elongated workpiece for support from said board and abutment against said one side of said support member, one end portion of said support member having an upwardly opening transverse notch formed therein adjacent one of said support arms, a square mounting panel having pairs of opposite side marginal edge portions, said support arms defining opposing channels in which said pairs of opposite side edge portion may be slidingly received, an elongated slot formed in said panel adjacent one of said edge portions and registrable with said notch when said one edge portion is engaged in the channel of the support arm adjacent said notch, said panel including means for securing the base plate of a circular saw in position on the upper surface of said panel with the blade of the circular saw projecting downwardly through said slot, at least the ends of said channels defined by said other pair of corresponding ends of said arms being open.

* * * * *